Figure 1:
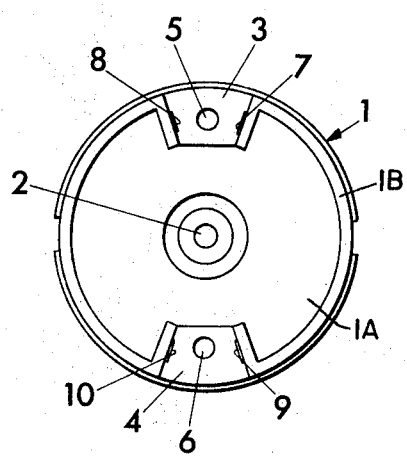

United States Patent
Mabuchi

[15] 3,662,202
[45] May 9, 1972

[54] BRUSH HOLDING ASSEMBLY FOR MINIATURE ELECTRIC MOTOR

[72] Inventor: Takaichi Mabuchi, Tokyo, Japan

[73] Assignee: Tokyo Kagaku Kabushiki Kaisha, Tokyo, Japan

[22] Filed: Aug. 25, 1970

[21] Appl. No.: 66,760

[30] Foreign Application Priority Data

Aug. 30, 1969 Japan....................................44/81959

[52] U.S. Cl............................................................310/239
[51] Int. Cl.......................................................H02k 19/04
[58] Field of Search..................310/239, 246, 229, 238, 242, 310/244, 245, 233, 248

[56] References Cited

UNITED STATES PATENTS 3,296,473  1/1967  Mabuchi..............................310/239
2,301,425  3/1939  List.........................................310/40

FOREIGN PATENTS OR APPLICATIONS 421,262     3/1967  Switzerland............................310/242
1,108,080   4/1968  Great Britain..........................310/239
1,293,318   4/1969  Germany................................310/248

Primary Examiner—J. D. Miller
Assistant Examiner—R. Skudy
Attorney—Woodhams, Blanchard and Flynn

[57] ABSTRACT

A brush holding assembly for a miniature electric motor comprising a pair of recessed channels provided inside of the end cover of the motor casing at diametrically opposed portions of the cover, and a pair of bores formed at opposite sides of each of said channels to receive terminals of brushes. Such a brush holding assembly is capable of a selective brush mounting according to the direction of rotor rotation.

4 Claims, 9 Drawing Figures

PATENTED MAY 9 1972 3,662,202

SHEET 1 OF 2

INVENTOR.
TAKAICHI MABUCHI
BY
Woodhams, Blanchard & Flynn
ATTORNEYS 3,662,202

BRUSH HOLDING ASSEMBLY FOR MINIATURE ELECTRIC MOTOR

This invention relates to a brush holding assembly for a miniature electric motor which permits a selective mounting of brushes adapted to the rotation direction of the motor.

A motor, in general, may be rotated in one direction only or in both directions according to the end of the application through switching operation. In the conventional miniature motor of the type, however, it is impossible to change the mounting of the brushes, which slidingly contact with a commutator of a rotor, to the rotation direction of the motor, to wit, if the motor is rotated in a single direction, either clockwise or counterclockwise, or it is rotated in both directions. Accordingly, the efficiency of sliding contact of the brushes mounted on such a conventional motor with the commutator is not uniform in a clockwise rotation and in a counterclockwise rotation, which lowers the efficiency of rotation and causes a partial or nonuniform abrasion of the brushes.

It is, therefore, an object of this invention to provide a brush holding assembly for a miniature electric motor of a high rotation efficiency which allows adaptive mounting of the brushes depending upon the direction of a rotor.

Figure 2:
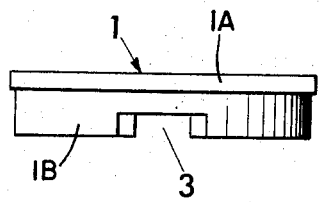
Figure 3:
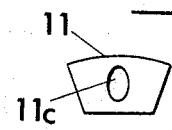
Figure 4:
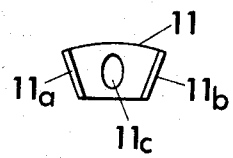
Figure 5:
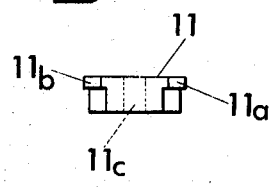
Figure 6:
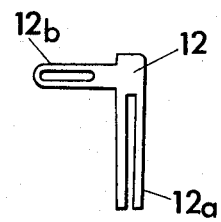

The foregoing and other objects, features and advantages of the invention will be apparent from the following more particular description of the preferred embodiment of the invention, as illustrated in the accompanying drawings, in which:

FIG. 1 is an inside plan view of an end cover of a motor;
FIG. 2 is a side view of FIG. 1;
FIG. 3 is a plan view of a fixing member;
FIG. 4 is a plan view of the rear side of FIG. 3;
FIG. 5 is a side view of FIG. 3;
FIG. 6 is a plan view of a brush; and
FIG. 7 through FIG. 9 are plan views showing the arrangement of the brushes according to the present invention.

Referring now to the accompanying drawings, there is illustrated a brush holding assembly. The numeral 1 designates an end cover made of a non-conductive material such as plastics and adapted to be fitted to an open end of a motor casing. The cover 1 includes a plate-like portion 1A having a substantially annular flange 1B extending axially therefrom. The numeral 2 designates a bearing centrally provided on the end cover 1 and the numerals 3 and 4 designate diametrically opposed recessed channels formed in the flange 1B and located at top and bottom portions, respectively, inside of the end plate 1A. Said recessed channels 3 and 4 are tapered toward the center. The numerals 5 and 6 indicate threaded bores provided in the end cover 1 at the respective central portions of the recessed channels 3 and 4. The numerals 7, 8 and 9, 10 designate bores or slots which extend axially into the end cover 1 from the bottom of the channels, and into which brush terminals are to be inserted and which are formed in the end cover 1 at the respective opposite sides of the recessed channels 3 and 4. The numeral 11 indicates a fixing member adapted to be fitted to the recessed channel 3 or 4 formed in the end cover 1. The fixing member is made of a non-conductive material such as plastics, as in the case of the end cover 1, and has flanges 11a and 11b integrally formed on its surface at both sides and a bore 11c formed at its center. The numeral 12 designates a brush stamped from a high conductive metal sheet and having a brush portion 12a and a terminal portion 12b. Said brush portion 12a is adapted to slidably contact with a commutator of a rotor. The numeral 13 indicates a screw for clamping said fixing member 11 to said recessed channel 3 or 4 of the end cover 1 and the numeral 14 designates a commutator.

As mentioned above, in accordance with this invention, diametrically opposed recessed channels 3 and 4 are provided at the top and bottom portions inside of the end cover 1, the bores 7, 8 and 9, 10 into which the terminals 12b of the brushes 12 are inserted are formed in the end cover 1 at respective opposite sides of the recessed channels 3 and 4, and the fixing members 11 adapted to be fitted to the recessed channels 3 and 4 are provided to secure the brushes 12 to respective channels 3 and 4, thereby to enable the brushes to be adaptively mounted to the direction of the motor or the rotor rotation.

Figure 7:
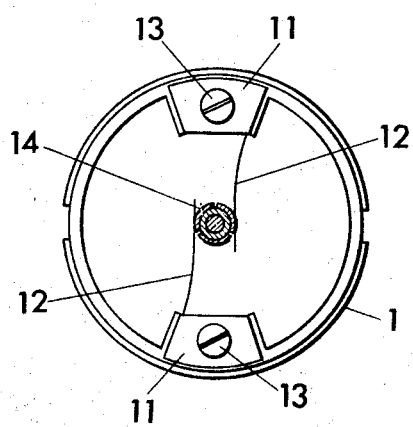
Figure 8:
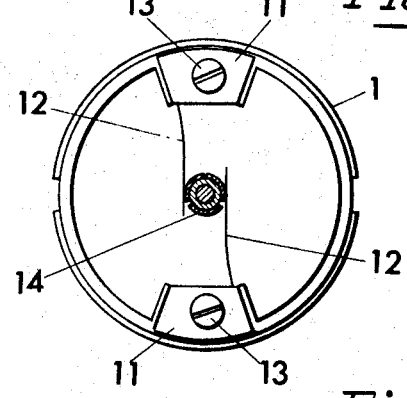
Figure 9:
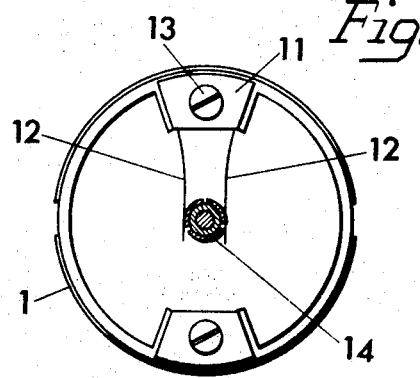

More particularly, the brushes 12 are mounted in a manner as shown in FIGS. 7 or 8 for a motor which rotates in one predetermined direction, i.e., either clockwise or counterclockwise and the brushes 12 are mounted in a manner as shown in FIG. 9 for a motor which rotates selectively clockwise or counterclockwise according to the end of application.

The terminals 12b of the brushes 12 are respectively inserted into and secured in the slots 7 and 10 respectively formed in the recessed channels 3 and 4 in FIG. 7 and the terminals 12b of the brushes 12 are respectively inserted into and secured in the slots 8 and 9 respectively formed in the recessed channels 3 and 4 in FIG. 8. With such arrangements as shown in FIGS. 7 and 8, the rotation of the commutator 14 in a predetermined direction causes a "push-up" force to push up the brushes 12 from their base ends to their free ends when the commutator 14 slidingly contacts with the brushes 12. Thus, as compared with the brushes which slidingly contact with the commutator in a "pushed-down" way, the arrangements specified above have the advantages of more smooth sliding contact of the brushes 12 with the commutator 14, more excellent conduction effect through the sliding contact and resultant enhancement of rotational efficiency.

Referring to FIG. 9, there is shown another arrangement of the brushes for the rotor which is selectively rotated in both directions, wherein the terminals 12b of the brushes 12 are respectively inserted into and secured in the slots 7 and 8 formed in the recessed channel 3. One of the two brushes 12 contacts with the commutator 14 in a "push-up" way if the rotor rotates clockwise or counterclockwise, though the other brush 12 contacts with the commutator 14 in a "push-down" way.

Thus, with the arrangement in accordance with this invention, the brushes may be mounted in three different ways according to the direction of rotation of the rotor to enhance the effect of the sliding contact with the commutator and the efficiency of rotation, thereby to provide a brush holding assembly for a miniature motor at a reasonable price.

What is claimed is:

1. A brush holding assembly for a miniature electric motor, comprising:

an end cover constructed of a non-conductive material and adapted to be fitted to an open end of a casing for a motor;

said cover having on the inside thereof wall means defining a pair of diametrically opposed recessed channels, said wall means having spaced and opposed sidewalls which converge relative to one another in a direction toward the center of the end cover whereby each recessed channel tapers in a direction toward the center of said end cover;

said end cover also having pairs of bores formed therein with at least one pair of bores being associated with each of said recessed channels, one of said bores of each pair communicating with its associated channel adjacent one sidewall thereof, and the other bore of each pair communicating with its associated channel adjacent the other sidewall thereof;

a conductive brush member associated with one of said recessed channels and having a base portion disposed within one of the bores associated with said one recessed channel;

said brush member also having a contact portion extending inwardly relative to said cover and adapted for sliding contact with a commutator of said motor; and a fixing member constructed of a nonconductive material and disposed within each of said recessed channels, said fixing member having a tapered configuration corresponding to the tapered configuration of its associated recessed channel, whereby the fixing member associated with said one recessed channel fixedly secures said brush member to said end cover.

2. An assembly according to claim 1, wherein said end cover includes a platelike portion having a substantially annular flange extending axially therefrom, said annular flange having said recessed channels formed therein on substantially diametrically opposite sides thereof, and said wall means being defined at least in part by said annular flange whereby each recessed channel is defined by a substantially planar bottom wall and a pair of opposite sidewalls which converge inwardly toward one another in a direction toward the center of said end cover, and the pair of bores associated with each recessed channel being formed in the bottom wall thereof directly adjacent the sidewalls, said bores extending substantially axially into said end cover.

3. An assembly according to claim 2, wherein said brush member has the base and terminal portions thereof disposed within substantially the same plane and extending at substantially right angles relative to one another, the base portion extending into one of said bores whereby at least a pair of said brush member is claimed between one of the sidewalls defining said recessed channel and an adjacent sidewall of said fixing member.

4. An assembly according to claim 3, wherein said end cover is provided with a threaded bore therein, said threaded bore communicating with the bottom wall of said recessed channel, the tapered fixing member associated with said recessed channel having an oblong bore extending through the central portion thereof, and threaded fastening means extending through the bore in said fixing member for threaded engagement with the threaded bore formed in said end cover.

* * * * *

UNITED STATES PATENT OFFICE
CERTIFICATE OF CORRECTION

Patent No. 3 662 202                    Dated  May 9, 1972

Inventor(s)  Takaichi Mabuchi

It is certified that error appears in the above-identified patent and that said Letters Patent are hereby corrected as shown below:

Column 4, line 3; change "a pair of" to ---a part of---.
Column 4, line 4; change "claimed" to ---clamped---.

Signed and sealed this 19th day of September 1972.

(SEAL)
Attest:

EDWARD M. FLETCHER, JR.                ROBERT GOTTSCHALK
Attesting Officer                      Commissioner of Patents